(No Model.)
W. AGER.
PROCESS OF DECORTICATING GRAIN.
No. 259,452. Patented June 13, 1882.
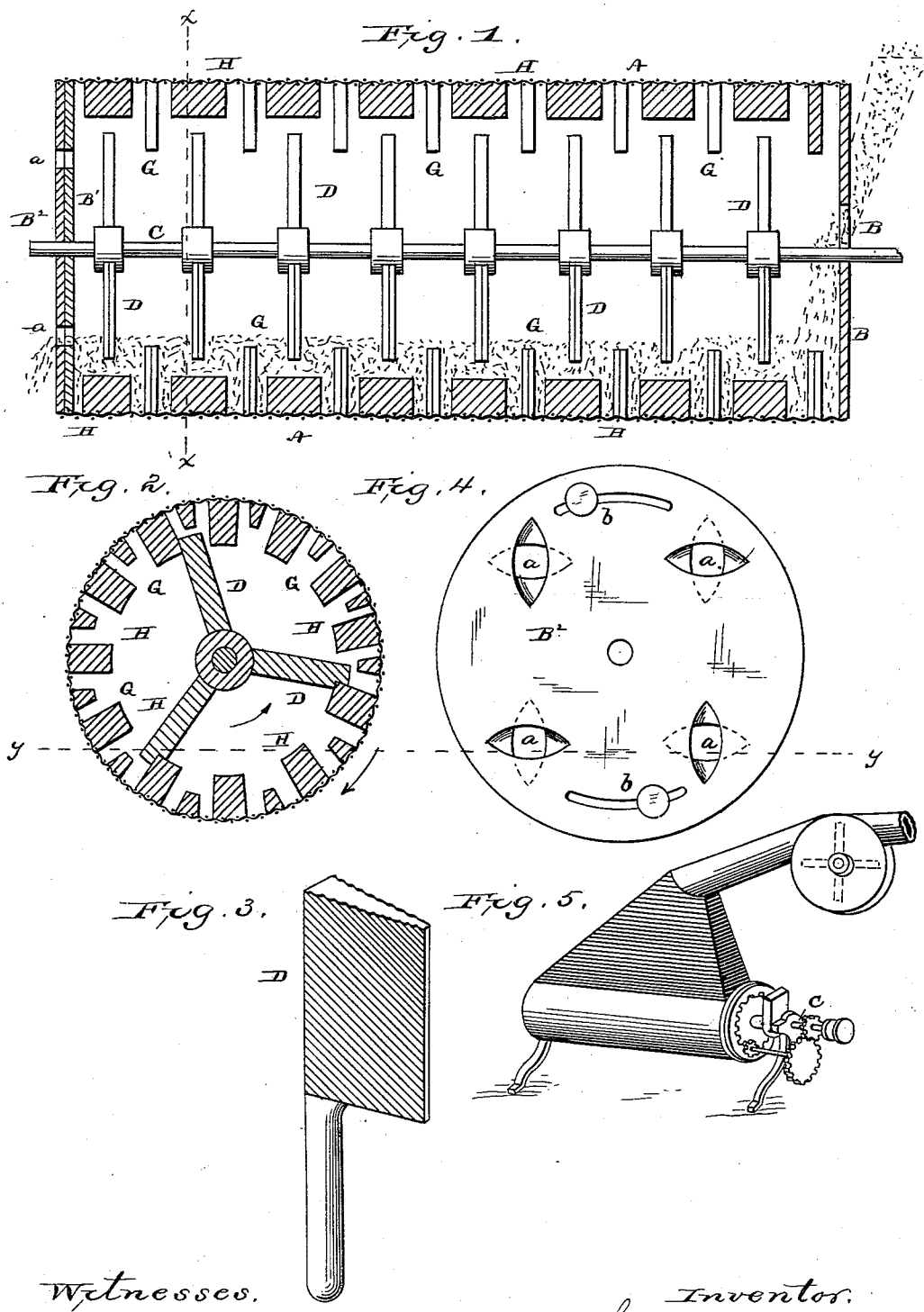

UNITED STATES PATENT OFFICE.

WILSON AGER, OF WASHINGTON, DISTRICT OF COLUMBIA.

PROCESS OF DECORTICATING GRAIN.

SPECIFICATION forming part of Letters Patent No. 259,452, dated June 13, 1882.

Application filed April 24, 1882. (No model.)

*To all whom it may concern:*

Be it known that I, WILSON AGER, of Washington, in the District of Columbia, have invented a certain new and useful Improved Process of Decorticating Grain; and I do hereby declare that the following is a full, clear, and exact description thereof, reference being had to the accompanying drawings, and to the letters of reference marked thereon, making a part of this specification.

My invention relates to an improvement on processes of decorticating grain; and the nature of my invention consists in the method or process, hereinafter explained, of subjecting a horizontally moving and rolling mass of grain and cereals contained in a suitable receptacle to the abrading action of decorticating arms or blades, which are arranged to revolve about a horizontal axis in a screen-cylinder or other suitable receptacle under the influence of strong currents of air, the feed of the grain into one end of the said cylinder being equal to the discharge of the grain at the opposite end of this cylinder, as will be hereinafter explained.

In the annexed drawings, Figure 1 is a diametrical section. Fig. 2 is a transverse vertical section. Fig. 3 is a perspective view of one of the decorticating-blades. Fig. 4 is an end view of one end of the cylinder, showing the adjustable head and the discharge-openings; and Fig. 5 is a perspective view of the machine complete.

Part of the machine represented in the annexed drawings is the subject of an application which was filed July 30, 1881, and another part of the machine represented is the subject of another application which was filed September 17, 1881.

As the subject of this invention is a process of decorticating grain and cereals, I do not confine myself to the precise machinery herein shown and described, as other suitable means may be adopted for conducting my improved process.

The letter A designates a cylindrical screen, which should be arranged horizontally, and B B' B² the heads thereof.

The grain is fed into the cylinder A through the head B from a hopper, and discharged from the opposite end of the cylinder through the heads B' B². Centrally through this horizontal cylinder passes a shaft, C, having a series of radial arms or decorticators, D, which may be made of any suitable material presenting serrated or abrading surfaces. These arms may be made of steel with file-surfaces, or of natural or artificial abrasive material—such as Derbyshire gray, tanite, or pressed Turkish emery properly molded or shaped. The said arms are preferably made triangular in cross-section, as shown, although they may be made of other shapes.

The shaft C, with its arms or beaters D, receives rotation by suitable machinery in the direction indicated by the arrow in Fig. 2. The cylinder A receives a slower rotation than the shaft C and in an opposite direction, as indicated by the arrow.

Rigidly secured to the inner side of the cylinder A, and arranged in any suitable manner, are decorticators G H, which may be of an equal or unequal length. The decorticators G are preferably arranged edgewise with respect to arms D, and are, like these arms, triangular in cross-section and present serrated or abrading surfaces to the body of grain in the cylinder to which they are attached. The decorticators H are preferably arranged flatwise with respect to the radial arms D, and aid in elevating the grain during the decorticating process.

The screen-cylinder A is suitably incased, and the interior of this case communicates with a fan for the purpose of creating currents of air, and thereby carrying off the pellicle, dust, and other foreign matters separated from the grain during the decorticating process.

The foreign matters are carried off through the meshes of the cylinder A and through the casing which incloses this cylinder, and which is represented in Fig 5.

The grain is fed into the cylinder A uniformly, and in like manner discharged through openings *a*, which are formed by oblong slots through the cylinder-heads B' B². The outer head is movable about its axis, and the slots are of such a shape that the points of discharge of the grain can be raised or lowered without materially increasing or diminishing their size. The conjugate diameters of the slots *a* are tangential to a circle described within the circumference of each head B' B² concentric to the axis of the shaft C. By means of set-screws $b$ the movable head $B^2$ can be fixed to the head $B'$ after adjustment. By these means a uniform discharge of grain can be obtained, although the points of discharge be adjusted higher or lower, according to the quality of the grain acted on.

The proper level of the grain to produce the best result is maintained by regulating the distance of the discharge-openings from the circumference of the cylinder and the amount of feed, as above described.

It is essential to the successful carrying out of my process that the feed of the grain into one end of the screen-cylinder should be equal to the discharge of the grain from the opposite end of said cylinder, and it is also essential that the grain be moved horizontally through the cylinder, so that the depth of the mass of grain will be about equal from one end to the other of the cylinder.

In conducting my process I maintain such a feed-pressure of the grain in the cylinder that the body of grain will act by its own gravity to keep itself against the decorticating-beaters with a pressure which is sufficient to allow the abrading-surfaces of these beaters to remove the feathery tails, the germ-cells, and the cortical portions of the grain, leaving all of the nutritive elements unimpaired, the foreign matters being carried off during this process by currents of air, as above described.

It is important, in carrying out my invention, that the grains be subjected to a rolling action, which is produced by the screen-cylinder and the decorticating arms or blades.

Having described my invention, I claim—

A process of decorticating grain, which consists in first subjecting the horizontally moving and rolling mass of grain contained in a suitable receptacle to the action of rasping or abrasive beaters; second, in maintaining a mass of grain in the receptacle or cylinder by a uniform feed and discharge that will make the weight of the mass a factor for keeping the grain against the abrading and beating surfaces with sufficient pressure to cause the removal of the impurities; and, third, in the withdrawal of the impurities by air-currents, substantially in the manner and for the purposes described.

In testimony whereof I affix my signature, in presence of two witnesses, this 24th day of April, 1882.

WILSON AGER.

Witnesses:
J. J. McCARTHY,
CHAS. D. DAVIS.